United States Patent [19]

Gregor et al.

[11] Patent Number: 5,280,078

[45] Date of Patent: Jan. 18, 1994

[54] HOMOPOLYMERS AND COPOLYMERS OF ACRYLAMIDE N-SUBSTITUTED ACRYLAMIDE OR N-SUBSTITUTED METHACRYLAMIDE SOLID STATE CROSS-LINKED WITH POLYAMINES OR POLYOLS

[76] Inventors: Harry P. Gregor, 410 Riverside Dr., New York, N.Y. 10025; Edgar Samuelson, 348-68 St., Brooklyn, N.Y. 11220; Paul I. Dalven, 28/08 Chatam, Sofer Street, A'Manuel, Israel, 90943; Charles D. Gregor, 530 W. 113 St., New York, N.Y. 10025

[21] Appl. No.: 764,986

[22] Filed: Sep. 23, 1991

Related U.S. Application Data

[63] Continuation of Ser. No. 376,726, Jul. 7, 1989, abandoned, which is a continuation of Ser. No. 201,252, May 25, 1988, abandoned, which is a continuation of Ser. No. 845,856, Apr. 2, 1986, abandoned, which is a continuation-in-part of Ser. No. 622,417, Jun. 20, 1984, Pat. No. 4,596,858, which is a continuation of Ser. No. 325,803, Nov. 27, 1981, abandoned.

[51] Int. Cl.$^5$ .............................. C08F 8/30; C08F 8/14
[52] U.S. Cl. .............................. 525/328.5; 525/328.2; 525/328.4; 525/329.4; 525/329.9; 525/330.5
[58] Field of Search .............. 525/328.2, 328.5, 328.8, 525/329.4, 329.9, 330.3, 330.5

[56] References Cited

U.S. PATENT DOCUMENTS

| | | | |
|---|---|---|---|
| 3,488,720 | 1/1970 | Nagy | 525/329.4 |
| 3,532,768 | 10/1970 | Dalibor | 525/384 |
| 3,642,726 | 2/1972 | Heilman | 525/384 |
| 3,954,721 | 5/1976 | Gross | 525/384 |
| 4,389,513 | 6/1983 | Miyazaki | 525/381 |
| 4,521,452 | 6/1985 | Highsmith | 525/382 |
| 4,666,983 | 5/1987 | Tsubakimoto | 525/382 |
| 4,778,869 | 10/1988 | Schirmann | 525/382 |
| 4,921,904 | 5/1990 | Sparapany | 525/382 |

FOREIGN PATENT DOCUMENTS 95906 8/1981 Japan.

*Primary Examiner*—Christopher Henderson
*Attorney, Agent, or Firm*—Sprung Horn Kramer & Woods

[57] ABSTRACT

Cross-linked polymeric gels or films are prepared by dissolving in a suitable solvent a linear polymer or polymers at least one of which is predominantly (at least 80%) made from monomers containing pendant amidocarbonyl or oxycarbonyl groups. For the cross-linking reaction are present either hydroxyl groups, present as either pendant groups from the polymer, or as low molecular weight polyols; or amino groups, present as either pendant groups from the polymer, or as low molecular weight diamines or polyamines. Either no catalyst is present or a strongly acidic catalyst (which may also be a pendant group on a polymer) is used. The solvent is removed by coagulation and/or drying and the dry material is heat-cured, thus cross-linking and insolubilizing the polymer or polymers.

6 Claims, No Drawings

HOMOPOLYMERS AND COPOLYMERS OF ACRYLAMIDE N-SUBSTITUTED ACRYLAMIDE OR N-SUBSTITUTED METHACRYLAMIDE SOLID STATE CROSS-LINKED WITH POLYAMINES OR POLYOLS

This application is a continuation, of application Ser. No. 376,726, filed Jul. 7, 1989, abandoned. which is a continuation of application Ser. No. 201,252, filed May 25, 1988, abandoned, which is a continuation of Ser. No. 845,856 filed Apr. 2, 1986, * *abandoned, which is a continuation in part of Ser. No. 622,417 filed Jun. 20, 1984, now U.S. Pat. No. 4,596,858 which is a continuation of Ser. No. 325,803 filed Nov. 27, 1981, abandoned.

BACKGROUND OF THE INVENTION

The present invention relates to novel solid polymeric compositions, their preparation and cross-linking, and their uses.

A well-established method for improving the physical properties and solvent resistance of linear polymers is cross-linking, in which the individual polymer chains are joined at many points to yield an interconnected network. The cross-links may be ionic in character, as in complexes of poly-acids with poly-bases, but covalent or chemical cross-linking is stronger, more resistant to hydrolysis, and more versatile in its applications.

The most common way of achieving covalent cross-linking is to use a polyfunctional monomer in the polymerization reaction itself (e.g., divinylbenzene together with styrene). Since cross-linked polymers cannot be dissolved, melted or cast, the polymerization must be carried out in the final physical shape required. Problems often arise in the preparation of films and membranes when catalysts must be introduced or inhibitors such as oxygen excluded from the polymerization reaction. Furthermore, the monomers themselves are often too toxic, volatile, or fluid to be conveniently processed in this manner. All of these factors make the manufacturing process difficult and costly.

It is thus often preferably to prepare a linear polymer or polymers, dissolve them in an appropriate solvent, spray or cast in the final form required, and only then introduce the cross-links. A familiar example of such post-cross-linking is the vulcanization of rubber, in which linear polyisoprene is mixed with sulfur, molded and then heat-cured. Another example is the cross-linking of various unsaturated polymers by light to produce plates for photoengraving.

Although many polymers will form loosely cross-linked gels upon heating, the mechanism is often obscure and the cross-linking difficult to predict or control. The present invention provides a post-cross-linking method unique in its mechanism, in the range of polymers to which it applies, an in its practicality and wide range of application. It is believed to proceed via the alcoholysis of pendant amide or ester groups on the polymer with hydroxyl groups to produce a new ester linkage between polymer chains, or the amidolysis (or aminolysis) of pendant amide or ester groups on the polymer with amino groups to produce a new amide linkage between polymer chains, or the reaction of pendant carboxyl groups on the polymer with hydroxyl or amino groups to produce new ester or amid linkages. Depending on the nature of the reaction and the leaving group involved, the use of an acid or base catalyst or not catalyst at all is employed to obtain optimal cross-linking.

Alcoholysis or amides and esters is a well-known reaction in the organic chemistry of small molecules, where it generally is run in solution at reflux temperature with strong acid or base catalysts. It is one of several mechanisms postulated by Kopecek and Bazilova to account for unusually high molecular weights obtained in the solution polymerization of N-(2-hydroxypropyl) methacrylamide (*European Polymer Jornal*, 1973, vol. 9, pp. 10–11.) These authors considered only the possibility of dimerization, not actual cross-linking, and did not report any insolubilization taking place. The unusual feature of the alcoholysis, aminolysis and transamidation reactions described in this invention is their occurrence in the solid state in the absence of solvent, a phenomenon entirely unexpected and heretofore unreported.

Similarly, amidolysis of amides and esters is a well known reaction in the organic chemistry of small molecules, generally performed at elevated temperatures, sometimes with a base catalyst, other times with an acid catalyst or no catalyst at all depending on the nature of the solvent and the leaving group. The novel post-cross-linking techniques taught by this invention have many unique advantages, particularly in the manufacture of synthetic membranes. Conventional membranes for reverse osmosis (RO) and ultrafiltration (UF) are made of polymers that are insoluble in the fluid acted on by the membrane (water, in most cases). Typically, a linear polyamide, polysulfone, or cellulose acetate is cast from an organic solvent and coagulated in water. Although such membranes are rigid and physically strong, they are hydrophobic in nature and tend to foul through adsorption of hydrophobic particles and solutes in the feed stream. Such fouling is a major problem in industrial use of membranes, making frequent cleaning or costly pretreatment necessary.

Strongly hydrophilic polymers, particular those where in at least 80% of their constituent units are highly polar so the linear polymer is highly soluble in water, which include those having a fixed positive or negative charge on each unit or an uncharged species with a similarly high affinity for water such as acrylamide, have been shown to resist such adsorptive fouling. However, they either dissolve in water or, unless substantially cross-linked, form a soft gel. Useful membranes may be formed of such polymers only by a high degree of cross-linking, so they swell not more than 3–5 times by weight when soaked in water. Since the pore structure of such membranes is generally created by coagulation and since monomers are essentially uncoagulable, the best practical route is post-cross-linking of the coagulated linear polymer. Using the techniques taught by this invention, highly cross-linked UF membranes of controlled porosity may be cast from very hydrophilic polymers. The intricate pore structure of these coagulated membranes is preserved by solid state post-cross-linking. Furthermore, charged functionalities such as sulfonate or quaternary ammonium may be incorporated to yield a cross-linked interpolymer membrane of the type described by Gregor (U.S. Pat. N. 3,808,305), where the fixed charges serve to reject charged colloidal particles and, to a lesser extent, dissolved salts.

A typical and commonly employed hydrophilic support medium is cross-linked polyacrylamide (PAM) beads of different sizes and different degrees of crosslinking, the latter acting to control pore size. PAM contains a hydrocarbon skeleton to which are attached pendant amidocarbonyl groups which contain an amide ammonia nitrogen, one readily replaced by certain other nitrogen compounds, thus permitting the formation of several derivatives having useful properties. A typical, earlier study by Inman and Dintzis (*Biochemistry*, 1969, vol. 8, pp. 4074–4082.) showed that commercially available beads made of cross-linked copolymers of acrylamide and N, N'-methylenebisacrylamide could be treated by several different reactions to make useful products. These authors performed the direct aminoethylation of the beads as well as the preparation of a number of derivatives from these beads including those of the: hydrazide; trinitrophenyl; 2,4 dinitrosophenylaminoethyl; succinylhydrazide; sulfoethyl; p-hydroxyphenethyl. Also, these authors found it was possible to effect the coupling of primary amines via the general acyl azide procedure employing, in this case, the hydrazide derivative. These authors also achieved coupling to proteins such as to serum albumin via the acyl azide reaction, and to trypsin via the treatment of the hydrazide derivative with cold nitrous acid, followed by treatment with a suitable solution of trypsin. These authors also converted the aminoethyl derivative of PAM with p-nitrobenzoylazide, followed by triethylamine and washing with DMF to form the p-nitrobenzamidoethyl derivative which was then converted to the p-aminobenzamidoethyl derivative. The latter, after treatment with nitrous acid was employed for the coupling of bovine serum albumin via the diazonium intermediate. These authors then employed some of these derivatives as immobilized enzymes and as immunoadsorbents.

The materials which can be prepared by the teachings of the subject invention constitute, particularly useful and powerful tools for the techniques of modern biochemistry and molecular biology. Often these require a sequential and laborious laboratory procedure which usually must be carried out over a period of several days. Often one starts with substantial quantities of material, but very soon this is reduced to a dilute solution containing a small amount of material, of which a very small fraction is the desired component. The classical biochemical techniques which involve salt precipitation, desalting and successive column chromatography, with a final concentration often achieved by freeze-drying and subsequent procedures, results in both an extremely laborious and time-consuming procedure and usually a loss or denaturization of the very substance which is desired as an end product of the entire process.

As a typical example, in the isolation of transcription factors, one first usually uses a large column which can be cross-linked heparin, ahydroxy-apetite or a phosphocellulose, for the purpose of concentrating the DNA binding proteins which have an affinity for these columns. The next step is to elute the active material, usually by the use of different salt gradients and test each eluted fraction for specific activity. Once an active fraction is isolated, it can be separated by using gel permeation chromatography to visualise the amount and approximate molecular weight of the protein in that fraction, and finally a certain band is isolated which contains substantial amounts of the activity of the proteins which constitute a transcription factor. Since none of these preparatory procedures produces a single band of the desired, purified protein, in virtually all circumstances the final purification procedure required consists of growing antibodies to the protein desired and employing these antibodies in an affinity chromatography system to finally obtain the pure protein. Since a desired component is a low molecular weight material such as a polypeptide present in a group of highly similar polypeptides, the problem is a particularly difficult one.

All of these procedures, involving as they do for the most part hydrophobic materials or surfaces to which the desired proteins may be adsorbed and lost, suffer from that disadvantage.

SUMMARY OF THE INVENTION

In accordance with the present invention, applicants have found that substantially improved cross-linked gels in the form of membranes, coatings, and formed objects can be prepared from a solution of a linear polymer or polymers, at least one of which has at least 80% of its units containing pendant amidocarbonyl or oxycarbonyl groups, with cross-linking affected by either hydroxyl groups, present as either pendant groups from the polymer, or as low molecular weight polyols; amino groups, present as either pendant groups from the polymer, or as low molecular weight diamines or polyamines. Where a catalyst is required or advantageous, such a catalyst is generally strongly acidic and is either of low molecular weight or may be a pendant group from the polymer. After removal of the solvent by drying or coagulation, followed by a high temperature cure, some of the amidocarbonyl or oxycarbonyl groups are alcoholyzed to form ester linkages that cross-link and insolublize the gel, or amide linkages which similarly cross-link and insolubilize the gel. This invention allows for the production of membranes, films and solid gels of excellent strength, controlled pore size, and controlled swelling, which may incorporate a wide variety of fixed charges and other functionalities.

DETAILED DESCRIPTION OF THE INVENTION

As noted above, the cross-linking reaction described in this invention involve the presence of the following functionalities: pendant amides or esters, alcohols, amines, and (in most cases) a strong acid. The alcohol or amine is either itself a pendant function on the polymer (e.g., hydroxyhexyl acrylamide copolymers) or a low molecular weight polyol (e.g., glycerol or pentaerythritol) or diamines or polyamines. The alcohol should be primary or secondary to avoid the side reaction of elimination, and should be non-volatile and slow to decompose under the conditions of the high temperature cure. The hydroxyl group may also be present in an incipient form, such as an epoxy. It is of course possible to run an inverse reaction with a low molecular weight bis-amide or bis-ester cross-linking a polymer with pendant alcohol groups, but no advantage is obtained and the resins tend to show less hydrolytic stability than those resulting from the normal cross-linking is involved, the amine group is preferentially a primary amine, but it may be a secondary amine, but not a tertiary amine and it should be of low volatility or non-volatile and slow to decompose at elevated temperatures.

The reaction is greatly facilitated by acid catalysis, although a few polymers such as polyacrylamide cross-link adequately in the absense of acid catalysts. The acid should be a strong acid, non-volatile and non-oxidizing. The acid may be pendant as in poly(3-sulfopropyl acrylate), or a separate low molecular weight molecule. Methanesulfonic acid is ideal for this purpose, but any similar, strong mineral or organic acid may be used. At least 0.1 mole acid catalyst per mole of the cross-linking alcohol functionality should be used, although no advantage is obtained by exceeding a 1:1 ratio. If the acid catalyst is a pendant functionality on the polymer, improved cross-linking results when an additional low molecular weight acid is used as well, presumably on account of its ability to become localized at the reactive sites.

Any long-chain molecule with pendant amidocarbonyl or oxycarbonyl groups is suitable for cross-linking under the teachings of this invention as long as it is stable under the conditions of the high-temperature cure. The most common and practical of these are N-substituted polyacrylamides and polymethacrylamides, esters of polyacrylic acid and polymethacrylic acid or the acids themselves, and homologs of the following polymers:

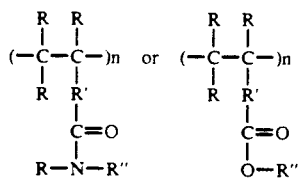

in which:

each R may be the same or different and is hydrogen, or an alkyl radical with up to 10 carbon atoms or aryl radical with up to 10 carbon atoms, R' is an alkylene radical with up to 10 carbon atoms or arylene radical with up to 10 carbon atoms, and R" is an alkyl radical with up to 10 carbon atoms, or an aryl radical with up to 10 carbon atoms, either of which may have a substituent which imparts a desirable functionality to the R" group, such as a carboxyl, sulfonic acid, amine, ammonium, or other functionality.

Alkyl substituents on the polymer backbone are thus permissible (e.g., polyethacrylamides or poly(2-propylacrylates)) and the amidocarbonyl or oxycarbonyl functionality may be suspended from the polymer backbone by one or more methylene units, as in amides or esters of poly(3-butenoic acid). Since experience has shown that the solid-state cross-linking reactions of this invention are quite susceptible to steric hinderance, substituents near the cross-linking site should be avoided where possible.

A wide variety of functional groups may be present on the alkyl N-substituents of polyacrylamides, or the alcohol moiety of polyacrylate esters. Polyacrylamides may have one, two, or no N-substituents. One notable restriction involves the presence of a positive charge near the amidocarbonyl functionality in N-substituted polyacrylamides. Since a positive charge is presumably developed at that site in the course of the reaction (appearing ultimately on the protonated amine byproduct), a second positive charge fixed nearby inhibits the cross-linking of such polymers. In the corresponding polyacrylates esters, the byproduct is a neutral alcohol and such polymers can in fact be cross-linked successfully. It should be noted that physical properties such as hydrophilicity may be affected by the replacement of pendant functional groups with a polyhydroxyl alcohol such as glycerol or pentaerythritol. Indeed, a monofunctional alcohol may be grafted onto a polymer by the present method, yielding a linear polymer with altered solubility.

A major advantage of the new cross-linking method is its occurrence in the solid state in the absence of solvent. The polymer chains lie entangled and in close proximity at the time of cross-linking, and therefore form a tight concatenated network that wells little in solvent. A consequence is the need to have good compatibility on a molecular level of all polymers and low molecular weight species in the solid state. If the catalyst or cross-linking agents gets excluded from the polymer while drying the reaction cannot be successful. If a matrix polymer phase-separates it cannot increase strength and reduce swelling as it ought. The rate and manner of drying affect the chain proximity. A polymer dried in an expanded state (e.g., freeze-dried) is unlikely to cross-link satisfactorily. Since the cross-linking reaction welds the polymer chains into what is in effect a single molecule, the molecular weight of the polymer is relatively unimportant. Very low molecular weight polymers (<50,000) tend not to be highly entangled in the solid state and give loose, highly swollen gels.

Other factors influence the tightness of the cross-linking under the teachings of this invention. The mole percent of cross-linking agent added and of cross-linkable pendant amide or ester groups in a copolymer is of considerable importance: As little as 0.1 mol % cross-linking agent or moiety (relative to the polymer's monomer content) can insolubilize a polymer as a very loose gel, while any in excess of 50 mol % can in principle no longer find reactive sites on the polymer. In order to achieve both the desirable qualities of the predominant groups in the chain and a high degree of cross-linking, at least 80% and as much as 100% of the chain units should consist of reactive sites. The longer the cure and higher the temperature, the more effective the cross-linking. No advantage is obtained by curing longer than three hours at 150° C., and while the practical, lower limit is one hour at 120° C., insolubilization can be achieved at lower temperatures and longer times.

The teachings of this invention are applicable to the preparation of many kinds of polymer membranes. For example, conventional RO membranes tend to suffer compaction or swelling over a period of time and are highly susceptible to biological and chemical attack (particularly chlorination). The tight cross-linking made possible by the teachings of this invention provides physical strength and mitigates the effect of polymer chain scission, thus enabling RO membranes to keep their selectivity under conditions of use. Furthermore, one may prepare an RO membrane with a hydrophilic, non-fouling coating, thus reducing the need for pretreatment of the feed stream.

Conventional electrodialysis (ED) membranes contain a small percentage of charged groups fixed inside the pores of a hydrophobic polymer matrix. Using the teachings of this invention, ED membranes with very high fixed charge densities, tight pore structures and low swelling may be prepared at low cost. Membrane permeation (MP) or pervaporation requires an extremely thin film which selectively absorbs one component of the feed stream without irreversible swelling or shrinking. The teachings of this invention allow one to incorporate any of a wide range of polymers with different chemical affinities into a film whose swelling is determined by the degree of cross-linking. Solvent extraction membranes must similarly resist excessive swelling but with controlled porosity, and these techniques are again applicable. Finally, the wide range of functional groups compatible with this method of post-cross-linking allows for unusual versatility in the preparation of porous, coagulated membranes for enzyme coupling.

The teachings of this invention enable one to make a wide range of novel and highly useful adhesive coatings. Cross-linked coatings have long been known to exhibit superior strength and solvent resistance, but their preparation generally involves either photolytic curing (as with paints) or noxious chemical monomers (as with epoxies). The present invention allows a viscous solution of a polymer and relatively innocuous cross-linking agents (which may be incorporated in the polymer) to be applied to a surface and cured by heat in a relatively short time. Polyacrylamide and its homologs may be cast into thin films suitable for electrophoresis. Coatings containing highly sulfonated polymers are anti-fouling, non-thrombogenic, and resist the adhesion of micro-organisms. They are thus useful for such purposes as coating heat exchangers, artificial heart valves, ship bottoms, and screens for suspended solids removal. It is also possible to make solid gels according to the teachings of this invention which combine high water content, high physical strength, biocompatibility, and resistance to biocontamination with optical clarity, making them ideal for long-wearing contact lenses and other devices used in eye care.

Other teachings of this invention include the treatment of papers and/or fabrics to effect either a surface cross-linking and/or an alteration of the surface properties of the paper or fabric to produce a desirable effect. The polymers of this invention can be used for the purpose of altering the mechanical properties and surface charge of a paper so as to improve its appearance, its receptivity to an ink or its feel or "hand". The same applies to fabrics for the purpose of improving their dye receptivity, resistance to creasing and their hand.

One important advantage of these polymers arises because the cross-linking process does not require the presence of soluble catalysts or co-reactants. This is an advantage in avoiding the stream pollution which results from most surface treatments. The fact that a high level of cross-linking can result without the evolution of toxic gases is another and major advantage. Cross-linking reactions which avoid the evolution of formaldehyde possess major advantages, for example.

The polymers of this invention can also be used as barrier films in the fabrication of microcircuit devices and chips, where their cross-linked nature and the ease with which adhesion is achieved is an important advantage. Similarly these polymers are highly useful in lithography where they can impart different levels of adsorptive or non-adsorptive properties to surfaces.

The teachings of this invention allow, among other things, the making of special purpose absorbents, particularly biochemical absorbents. Biochemical absorbents are preferably hydrophilic in nature so as to minimize the non-specific adsorption of proteins, although most of the carriers commonly employed for these purposes show an appreciable and deleterious degree of non-specific adsorption. Also, most of the useful carrier materials cannot be formed into sheets, films, coatings or membranes of controlled porosity in the manner in which a wide variety of hydrophilic materials can be so formed by post-cross-linking in accordance with the teachings of this invention.

This invention is advantageous in many respects. First, it allows for either a dialysis or ultrafiltration system which does not denature proteins, i.e. the active and desired proteins is not lost during the purification procedure. Further, ultrafiltration is a rapid technique readily suited to the removal of large amounts of salts and other low molecular weight foreign bodies from protein solutions. For proteins highly susceptible to denaturation, a coating applied to the tubing and cell according to the present invention will minimize or avoid denaturation. The polymers of the invention are particularly well suited for large as well as very small scale operations. Ultrafiltration using polymers according to the invention can be carried out with simple equipment at high speed. A subsequent example describes a very thin gel electrophoresis system suited to the analysis of very small samples.

The examples given below consist of monomer preparations, homopolymerizations, copolymerizations, cross-linking of polymer films and resins, and the casting and testing of membranes. The polymerizations given in the examples yield polymers of approximately the same molecular weight and comonomer composition as those called for in the cross-linking and membrane examples. Where differences occur, the polymerization procedures may readily be modified according to principles well known to those skilled in the art. For example, molecular weight may be increased by using less catalyst or decreased by adding an appropriate chain-transfer agent such as isopropanol. Since the reactivity ratios in almost all of the copolymerizations are comparable, the comonomer composition may be changed by appropriate adjustments in the initial amounts of the monomers. Where molecular weights are given, they were determined by either viscometry or gel permeation chromatography. Where no molecular weight standards exist, estimates were made based on the viscosity or gel permeation volume of similar known polymers. Since molecular weight may be varied by a factor of at least two without altering the results, the difference between weight and number averaging is insignificant.

All solutions of polymers were prepared on a weight/volume basis, with the total solute concentration given as percent by weight. The ratio of various solutes to each other is given as parts by weight. Concentrations of low molecular weight compounds are also given as mol % relative to the monomer units making up the polymer(s) in solution. All solvents are reagent grade, but in many cases practical or even commercial grads may be substituted. All water used as a solvent or reagent in the examples is distilled. All ethanol used is 200 proof. The swelling index is the ratio of the weight or volume of the resin swollen with solvent to that when dry, a standard measurement. All resins and membranes containing polyelectrolytes were soaked in saturated sodium chloride after heat-curing before being put in distilled water so as to minimize osmotic shock.

The membranes described below are all prepared using similar, basic techniques well known to those skilled in the art. Unless otherwise specified, all membranes described in the examples below are cast on Hollytex 3381, a calendered non-woven polyester cloth (Eaton-Dikeman Co.) The casting solution is filtered through a coarse glass frit, and any bubbles are then removed by either centrifugation or applying a vacuum. The viscous liquid polymer films are cast using either manually operated knives with fixed or adjustable gate openings (available from Gardner Laboratories) or motorized roller type units routinely used in the paper and coatings industries (available from Talboys Engineering Corp., Emerson N.J.)

Casting solutions completely free of any turbidity and prepared using solvents or solvent mixtures in which the polymers have a high or nearly maximal viscosity at a given solids content are very much preferred.

Casting and/or coating can also be effected by dipping a surface or support material into the casting solution; this method is often preferred when a particularly thin coat or film is desired, and allows the use of a dilute casting solution.

The pure water flux of the membranes is determined by mounting them in a standard ultrafiltration cell (Gelman) filled with prefiltered distilled water, applying 30-100 psi nitrogen pressure, and measuring the volume permeate per unit time. Fluxes are expressed as μsa, or microns per second atmosphere, and tend to be fairly independent of applied pressure. An approximation of pore size is obtained by measuring the percent rejection of the red dye erythrosin from a 15 ppm feed solution. The concentration of the dye (MW 836) is determined photometrically. Membranes of the RO type are tested by applying high pressures (400-800 psi) across the membrane and measuring the rejection of salt via conductivity.

Membrane porosity varies according to a number of factors which must be judiciously varied and controlled in order to obtain a desired value. For uncoagulated membranes the higher the solids content in the casting solution and the wider the gate opening on the casting knife, the more polymer deposited and the lower the flux. Slow evaporation of the solvent and a high degree of cross-linking produce non-porous gels with little swelling and low flux.

The flux of coagulated membranes depends on the fineness of the pore structure, which depends in turn on the speed of coagulation. A highly porous support such as Hollytex 3329 allows rapid attach on the cast film from both sides and results in larger pores. Membranes cast on dense supports such as Hollytex 3396, glass or "MYLAR" tend to have much lower fluxes. Wetting a porous support with the coagulating solvent causes some immediate coagulation upon casting and higher ultimate flux. The higher the temperature of the coagulating bath, the higher the flux, and where coagulation is slow, a longer residence time helps ensure complete extraction of the casting solvent. Allowing the cast film to partially dry before coagulation results in a finer pore structure on top and lower flux. If a coherent skin is allowed to form, a low-flux membrane of the Loeb-Sourirajan type is obtained.

The most reliable way of controlling porosity is by increasing or decreasing the solids content of the casting solution. High solids films coagulate more slowly and leave behind a denser pore structure. The higher the molecular weight of the polymer, the lower the solids content possible without changing the viscosity, and the higher the potential flux. There is generally a minimum molecular weight (MW) below which coagulation is poor and a maximum above which the solids content must be too low to give a coherent film structure. The polydispersity of the polymer should not be too high or the low molecular weight "tail" will cause anomalous coagulation. Tight cross-linking of hydrophilic, coagulated membranes keeps the pores from becoming excessively small due to swelling when the membrane is put in water, and thus improves the flux.

The examples given herein constitute only a small fraction of the monomers which can be polymerizaed to give materials which can be cross-linked in accordance with the teachings of this invention. For purposes of specific applications, one can choose optimal materials made from a number of monomers which are either described in the literature and/or available commercially. For example, acrylic and methacrylic acids are available as esters or amides having a wide range of substituents bonded to the oxygen or nitrogen atom, respectively. These include alkyl or aryl groups to which can be attached a wide range of ionic and non-ionic groups. One of the important advantages of the subject invention is that a very wide range of compounds having a number of specific uses can be employed as post-cross-linkable polymers, in accordance with the subject invention.

Similarly, the physical properties of the final product can be modified by the nature of the cross-linking agent used and the reaction employed. Cross-linking agents with longer chains between the reactive groups generally produce looser gels, while those with short distances between the two reactive sites produce materials of lower degrees of swelling in solvents in which the non-cross-linked polymers are soluble. One of the unique advantages of this particular invention is the fact that a bifunctional cross-linking agent has a multiplicity of sites on the reactive polymer wherein cross-linking can take place, and this allows a particularly high degree of cross-linking to be effected.

In the preparation of the numerous films, coatings, membranes and other materials described in the subject invention, usually it is essential that in the casting or formation of a polymer solution on a surface, there be adequate wetting of that surface though the drying and the final post-cross-linking process. In order to employ the manifold polymers and solvents useful for the purposes of this invention, the modification of common polymers is advantageous. For example, many aqueous solutions are not easily cast onto a PAN support membrane of the UF variety, so the sue of a 15:1 copolymer P(AN-AMPS) or of P(AN-MAPTAC) is advantageous.

GLOSSARY

The following abbreviations are used in the examples given below.

DES is diethylsuccinate, El Paso Products Co.
DMAC is dimethyl acetamide, Aldrich.
DMF is dimethylformamide, Fisher.
TCE is sym. tetrachloroethane, Fisher.
THF is tetrahydrofuran, Fisher.
TMP is trimethylol propane, Celanses.

A number of monomers are listed below, designated by the abbreviations used in the examples. Some are from the commercial sources specified, and the remainder have their preparations and physical properties given in the examples.

AM is acrylamide, Polysciences.
AMPS is 2-acrylamido-2-methylpropane sulfonic acid, Lubrizol Corp., Special Reaction Grade.
DMAM is N,N-dimethylacrylamide, Polysciences.
DNBAM is N,N-di-n-butylacrylamide, described herein.
HEA is hydroxyethyl acrylate, Pfaltz and Bauer.
HPA is hydroxypropyl acrylate, Pfaltz and Bauer.

HHAM is N-(6-hydroxyhexyl acrylamide), described herein.

MAPTAC is methylacrylamidopropyltrimethylammonium chloride, Texaco Chem.

NBAM is N,n-butyl acrylamide, described herein.

NBMAM is N,n-butyl methacrylamide, described herein.

NMAM is N-methyl acrylamide, Polysciences.

SEM is 2-sulfoethyl methacrylate, Dow Chem.

SPA(Na) is 3-sulfopropyl acrylate, sodium salt, described herein.

SSA(K) is styrenesulfonic acid, K+ salt, described herein.

TMEAC is trimethylaminoethylacrylate chloride, Monomer-Polymer.

Some of the polymers employed in the practice of this invention were prepared as described in the following examples, and are abbreviated by preceding the monomer name with a letter P. Others are commercially available materials from the suppliers indicated below.

"KYNAR" is polyvinylidene fluoride, Pennwalt Corp., Grade 301 of MW 375,000.

PAM is polyacrylamide, American Cyanmid, Cyanamer P-250, MW 5,000,000, unless otherwise designated.

PAN is polyacrylonitrile, DuPont. Neutral Modified Type A, MW 150,000, unless otherwise designated PSSA is polystyrenesulfonic acid, available from National Starch and Chem. of molecular weight 70,000, and prepared as described herein.

In addition, several other commercially available substances were employed:

AIBN is azobisisobutylnitrile, Eastman.

DNPD is N,N-di-2-naphthyl-p-phenylenediamine, Pfaltz & Bauer.

EPON 1031 is a tetrafunctional epoxide resin, Shell Chem.

Molecular Sieves is a drying agent with nominal 3 or 4 Angstrom pores, Davison Division of Grace Chemical.

MSA is methanesulfonic acid, Fisher.

Witcamide 511 is an emulsifying agent, Witco Chem.

EDA is ethylenediamine, DAH is diaminohexane and DAO is diaminooctaine, Aldrich.

The invention will now be described with reference to the following non-limiting examples.

EXAMPLES

Example 1

Preparation of N,N-di-(n-butyl) Acrylamide (DNBAM)

In a 2 liter 3-necked flask were combined 129 g (1 mol) di-(n-butyl)amine (Fisher Scientific) and 0.5 l dry toluene and cooled to 5° C. 46 g (0.5 mol) acryloyl chloride dissolved in 50 ml toluene were added slowly so the temperature remained below 10° C. After the addition the flask was warmed to 25° C. and the precipitate removed by filtration. 1 g DNPD was added, and after concentration on a rotary evaporator the product was distilled at 20 torr and 61°-63° C. Yield 77 g (84%).

EXAMPLE 2

Preparation of N-(6-hydroxyhexyl Acrylamide) (HHAM)

150 g 6-aminohexanol (Pfalz & Bauer) was distilled, ground, and dried overnight under vacuum. 1 liter dry THF was added at 40° C. and the solution cooled to 10° C., causing partial precipitation. 52 ml (57.9 g) acryloyl chloride was dripped in with stirring at 10°-15° C. over a period of 2.5 hours, with 200 ml additional THF added after 2 hours.

The white precipitate of aminohexanol hydrochloride formed was filtered, washed with 100 ml THF and then stirred with 300 ml THF. The latter portion of THF was filtered, treated with 5 grams silica gel, and refiltered into the main portion of the solution. Then 1 g hydroquinone was added and the THF solution evaporated under vacuum to an oil. Recrystallization from 500 ml ethyl acetate yielded 79.4 g of a white crystalline product. The mother liquor was evaporated and recrystallized from 75 ml ethyl acetate to yield an additional 4.0 g of product, m.p. 57.5°-58.5° C.

EXAMPLE 3

Preparation of N-n-butyl Acrylamide (NBAM)

146 g of n-butylamine (dried over 4 A Molecular Sieves) was dissolved in 1 liter of toluene (dried over calcium hydride) in a 2 liter 3-necked flask equipped with an ice-acetone bath, a mechanical stirrer, a thermometer and a dropping funnel. The solution was stirred and cooled to 0° C. 90.5 g distilled acryloyl chloride dissolved in 100 ml dry toluene was added slowly so that the temperature did not go above 10° C. After addition, the solution was allowed to come to room temperature and was then filtered through medium porosity filter paper. Then 1.5 g of the nonvolatile inhibitor DNPD was added and the solution concentrated on a rotary evaporator. Distillation at 0.05 torr and 85° C. yielded 115 g, a yield of 90.5%.

EXAMPLE 4

Preparation of N-n-butyl Methacrylamide (NBMAM)

In a 1 liter 3-necked flask were combined 400 ml dry THF and 40 ml distilled n-butylamine (0.405 mol). After cooling to 5° C. in an ice bath, 20 ml (0.205 mol) methacryloyl chloride was added slowly so as to keep the temperature below 10° C. The precipitate was removed by filtration, and the filtrate concentrated on a rotary evaporator. 1 g DNPD was added and the oil distilled at 76°-78° C. and 20 torr. Yield 24. 3 g (84%)

EXAMPLE 5

Preparation of 3-sulfopropyl Acrylate, Na Salt (SPA(Na))

19 g sodium acrylate, 7.5 g acrylic acid, 60 ml tert-butanol, and 0.1 g p-methoxyphenol were heated to reflux in 500 ml 3-neck flask. 25 g propanesultone (Aldrich) was added dropwise over a period of 2 hours, with more tert-butanol added as needed to maintain stirring. The precipitate was collected by filtration and vacuum dried to yield 40 g product.

EXAMPLE 6

Preparation of Styrene Sulfonate, K Salt SSA(K)

In a 3 liter 4-necked flask were combined 372 g (2.0 mol) 2-bromoethyl benzene (RSA Corp) and 1350 ml 1,2-dichloroethane, both having been dried over 4 A Molecular Sieves. The flask was warmed to 60° C. and flushed with nitrogen. 240 g (2.07 mol) chlorosulfonic acid (Eastman) dissolved in 150 ml 1,2-dichloroethane was added dropwise with rapid stirring. Stirring was continued at 60° C. until no additional hydrogen chloride was evolved. A partial vacuum was applied to remove residual HCl, and the flask was chilled to 10° C. A chilled solution of 135 g KOH in 750 ml distilled water was added, and the flask cooled to 0° C. The precipitate was collected using a Buchner funnel cooled with ice water, and then dried under vacuum to yield 440 g crude product. This was dissolved in a solution 95 g 86% aqueous KOH and 750 ml distilled water, warmed to 65° C. and filtered through a heated Buchner funnel. The filtrate was cooled slowly to 5° C., and the precipitate was collected and dried as before. Yield 300 g (67%).

EXAMPLE 7

Preparation of Poly(2-acrylamido-2-methylpropane Sulfonic Acid) (PAMPS)

50 g of AMPS was dissolved in 100 ml of distilled water and then purged 30 minutes with nitrogen at ambient temperature. 3.2 mg potassium peroxydisulfate dissolved in 1 ml water was added, purging continued for 10 minutes, and the container sealed and allowed to stand at 40° C. for 16 hours. The polymer was isolated by diluting to less than 10% solids and freeze-drying.

EXAMPLE 8

Preparation of Poly(methacrylamidopropyltrimethylAmmonium Chloride) (PMAPTAC)

Here, 100 g of a 50% (w/w) solution of MAPTAC in water was warmed with 2 g activated charcoal, stirred and filtered. The solution was purged with nitrogen for 15 min and warmed to 40° C. under nitrogen. A solution of 100 mg ammonium peroxydisulfate in 1 ml water was added, followed by a solution of 10 mg sodium metabisulfite in 1 ml water. The solution was stirred at 40° C. under nitrogen until its viscosity increased significantly, and then covered and set in an oven at 60° C. for 1 hour. The polymer was isolated by drying in a vacuum oven or diluting to 500 ml with water and freeze-drying. Its intrinsic viscosity was 769 ml/g for a 0.1% solution in water at 25° C.

EXAMPLE 9

Preparation of Poly(N-n-butyl Acrylamide) and Poly(N-n-butyl Methacrylamide) (PNBAM and PNBMAM)

Distilled NBAM was extracted with 0.1N sulfuric acid, washed with saturated sodium sulfate, dried over anhydrous sodium sulfate and filtered. Then 40 g was combined with 80 ml degassed, distilled water and 1.2 g sodium lauryl sulfate to yield a mixture of pH 4.0. The mixture was heated to 40° C. with stirring and nitrogen was bubbled through for 30 minutes. Then 50 mg of ammonium peroxydisulfate was added dissolved in 1 ml water. A latex formed within 10 minutes and polymerization was continued overnight. Ethanol was added to the latex to coagulate the polymer, which was then dissolved in 500 ml ethanol, precipitated into distilled water in a blender, and dried overnight under high vacuum to yield 32.2 g polymer.

The polymerization of NBMAM proceeds exactly the same way, with the n-butyl methacrylamide monomer substituted and the reaction run at 50° C.

EXAMPLE 10

Preparation of Poly(N,N-di-n-butylacrylamide) (PDNBAM)

75 g of DNBAm monomer were combined with 375 ml distilled water, 8 g sodium lauryl sulfate, and 100 mg ammonium peroxydisulfate and the pH adjusted to 4.0 with phosphoric acid. It was stirred with nitrogen bubbling through at 60° C. for 18 hours. The polymer was coagulated with methanol and blended with water to remove detergent and harden the polymer. It was dried under vacuum. Yield, 64 g.

EXAMPLE 11

Preparation of Poly(2-sulfoethyl Methacrylate) (PSEM)

A 30% solution in water of the SEM monomer was purge with nitrogen bubbling, then polymerized with the addition of 0.2% w/w (relative to the monomer) of ammonium peroxydisulfate at 50° C. for 16 hours. The solution was passed through a weak base ion-exchange column (Rohm & Haas IRA 60) to remove residual monomer and then freeze dried. The molecular weight was estimated at 100,000 by viscometric comparison with similar, known polymers.

EXAMPLE 12

Preparation of Poly(3-sulfopropyl Acrylate) (PSPA)

To 20 ml water purged with nitrogen was added 10 g SPA(Na) with stirring. The solution was warmed to 50° C., 1.0 mg ammonium peroxydisulfate was added, and the solution left covered in a 50° C. oven overnight. The solution was diluted to 5% solids, freeze-dried, re-dissolved to 5% solids in water, and acidified by passage through a strong acid ion-exchange column ("Amberlite 200", Rohm & Haas). The polymer was recovered by freeze-drying the diluted solution.

EXAMPLE 13

Preparation of Poly(styrene Sulfonic Acid) (PSSA)

In a 500 ml 3-necked flask were combined 180 g xylene, 20 g Witcamide 511 and 40 mg AIBN, and warmed to 55° C. under nitrogen. Stirring was maintained at 450 rpm using a stirring blade which largely filled the flask. The monomer charge of 30 g potassium styrene sulfonate in 90 ml water was added dropwise (0.5 ml/min), and the reaction continued for 72 hours. The emulsion was broken by pouring into 1 liter of acetone. The precipitate was removed, blended with 1 liter acetone, filtered and dried, yielding 31.6 g. This was dissolved in 600 ml water and precipitated into 1.3 liters absolute ethanol in a blender. The supernatant solvent was discarded and replaced by 1.5 liters absolute ethanol, which was blended until a finely divided material was obtained. This was filtered and dried yielding 21 g. Tis MW was determined to be about 2 million by comparison with sulfonated polystyrene standards using gel permeation chromatography. The polymer was dissolved in water to 5% solids, converted to the acid on a strong acid ion exchange column (Amerlite 200, Rohm & Haas) and then freeze-dried.

EXAMPLE 14

Preparation of Poly(trimethylaminoethylacrylate Chloride) (PTMEAC)

20 g of a 40% aqueous solution of TMEAC was treated with 1 g activated charcoal for 20 minutes and filtered. The filtrate was purged with nitrogen, 5 mg ammonium peroxydisulfte was added, and the solution was left overnight at 50° C. The polymer was precipitated with acetone, filtered, and dried, yielding 6 g (75%).

EXAMPLE 15

Preparation of P(AMPS-HHAM), 9:1 Copolymer 67.5 g AMPS, 6.14 g HHAM, and 300 ml water were combined in a 500 ml resin kettle fitted with a heating mantle, cooling coil, thermometer, overhead stirrer and fritted gas bubbler. Nitrogen was bubbled through the solution for one hour while the temperature was maintained at 58° C. Then, 35 mg ammonium peroxydisulfte and 15 mg sodium metabisulfite were each dissolved in 6 ml of degassed distilled water, and 2 ml of the peroxydisulfate solution was added to the kettle followed by 2 ml of the metabisulfite solution. The addition of 2 ml aliquots was repeated after 1.5 minutes and 5.5 minutes while the temperature was maintained as near 58° C. as possible.

After 1 hour, 300 ml distilled water was added and the viscous solution freeze-dried at $-20°$ C. The resulting polymer had an inherent viscosity of 227 ml/g when measured as a 0.5% solution in 3% NaCl.

EXAMPLE 16

Preparation of P(NBAM-HEA), 9:1 Copolymer

For a 10 mol % copolymer, the inhibitor in the HEA monomer was removed by dissolving 1.79 g (0.0154 mol) of HEA in 13 ml water and treatment with activated charcoal followed by filtration. This was combined with 40 ml methanol, 17.67 g NBAM (0.139 mol) and 90 mg AIBN. The polymer was isolated by addition of water in a blender followed by filtration and drying under vacuum at 45° C. The yield was 17.2 g (88%).

EXAMPLE 17

Preparation of P(AMPS-SSA), 1:1 Copolymer 22 g of the sodium salt AMPS and 24 g of SSA(K) (Fluka) were combined with 80 g water and purged with nitrogen at 40° C. 3 mg ammonium peroxydisulfate was added and purging was continued until the start of polymerization. The container was covered and left at 40° C. for 18 hours. Gel permeation chromatography revealed considerable monomer remaining. The solution was thus dialyzed against distilled water and the polymer isolated by freeze-drying. Yield 38 g.

EXAMPLE 18

Preparation of P(SSA-HEA), 4:1 Copolymer

In a 500 ml 3-necked flask were combined 130 g xylene and 13 g Witcamide 511 with 15 mg AIBN and then stirred at 50° C. under nitrogen. An aqueous phase was prepared by combining 21.5 g potassium styrene sulfonate, 65 ml water and 2.8 g HEA with charcoal and filtering. This was added dropwise (about 0.5 ml/minute) to the xylene phase with stirring at 450–500 rpm. After 48 hrs the polymer was isolated by pouring into 1 liter absolute ethanol in a blender, decanting the solvent and reblending with 700 ml ethanol. The yield was 15.4 g. Gel permeation chromatography showed the MW to be about 900,000.

EXAMPLE 19

Preparation of PAM, PNMAM, PDMAM; Crosslinking of PAM with Glycerol from Water

To prepare PAM of MW 1,000,000, 100 g of AM, 2.5 ml of 2 propanol (less or none give a higher MW, more a lower MW), water to 750 ml total, then purged with nitrogen gas. A solution of 50 mg of ammonium peroxydisulfate in 1 ml of purged water was followed by 25 mg of sodium metabisulfite in 1 ml purged water, then the solution under nitrogen was stirred and kept in a water bath at 25° C. As the reaction proceeded the temperature rose to 34° C. even with bath cooling, and it proceeded for 3 hours. Then water was added, the viscous solution stirred well and finally freeze-dried, mixed with 3 liters of methanol in a blender, filtered and dried.

PNMAM and PDMAM were prepared by identical procedures except that with increasing substitution a somewhat higher temperature was needed to maintain miscibility and no 2 propanol was added. The reaction was carried out 50° C. for 16 hours under nitrogen, and the product recovered by dilution with an excess of water followed by freeze-drying.

PAM is readily soluble in water, ethylene glycol and glycerol. With increasing substitution of methyl groups on the nitrogen, the polymer becomes soluble in many polymer organic solvents (DMF, phenol:TCE, ethanol) and can be coagulated by organic solvents as by diethylether.

To a 5% solution of 5,000,000 MW PAM in water was added 2.5 mol % of glycerol. The clear solution was dried in an aluminum dish at 60° C. and then cured for 3 hours at 140° C. After soaking in water at 80° C. for several hours the gel swelled slightly and was quite firm. When the preparation was repeated with 10 mol % glycerol, a hard, slippery gel was formed. When 50 mol % glycerol and 50 mol % MSA were used, the resulting gel appeared no different from the one made with 10 mol % glycerol alone.

PAM, PNMAM, and PDMAM could all be cross-linked by the same reactions as the other non-ionic substituted acrylamides. Films or membranes cast from PAM appeared to be the most hydrophilic, from PNMAM only slightly less hydrophilic and from PDMAM somewhat less hydrophilic, but all were strongly hydrophilic as contrasted with most polymers containing alcohol or amino groups on most links.

EXAMPLE 20

Cross-linking of PNBAM and PNBMAM from Ethanol 1.50 g PNBAM was dissolved in a solution with 0.11 ml glycerol and 0.34 ml MSA in 28.5 ml absolute ethanol. The viscous solution was poured to a thickness of 1 mm on an aluminum sheet, dried 30 min at 60° C., and then cured 3 hours at 140° C. The film was soaked in ethanol for a week; its weight swelling index was 4.5 in that solvent.

In a second experiment, 1.5 g PNBMAM was dissolved in a solution of 0.12 ml glycerol and 0.38 ml MSA in 13.5 ml ethanol. The solution was dried and cured as above, giving a film with a weight swelling index of 4.5 in ethanol.

In a third experiment, three solutions of PNBAM were prepared, each 8% in ethanol. The first contained no cross-linking agents, the second contained 3 mol % each of glycerol and MSA, and the third contained 20 mol % each of glycerol and MSA. Each solution was cast at a thickness of 7 mils on a film of carboxymethylcellulose laid over glass, dried at 60° C., and cured at 140° C. for three hours. After soaking in distilled water for nine days the water contents by weight were determined: uncross-linked, 12.9%; 3% cross-linked, 12.5%; 20% cross-linked, 30% water content.

EXAMPLE 21

Cross-linking of PDNBAM; Comparison with PNBAM

To a 5% solution of PDNBAM in 1:1 phenol:TCE was added 40 mol % each of MSA and glycerol. A similar solution was prepared of PNBAM. Each clear solution was poured into an aluminum dish, dried at 60° C. and cured 3 hours at 14° C. When 1:1 phenol:TCE solvent was added and the gels stirred overnight at 50° C., neither polymer dissolved. A coherent and strong film structure was observed with PNBAM, while PDNBAM swelled much more and had a loose, gel-like structure.

EXAMPLE 22

Cross-linking of PAMPS with Glycerol from Ethanol

To a solution of 10 g of PAMPS (MW 1,000,000) in 90 ml ethanol was added 0.89 g glycerol (20 mole %). The solution was cast at a thickness of 6 mils onto a glass plate, dried at 60° C. and then cured 3 hours at 150° C. After soaking briefly in saturated sodium sulfate, the film was soaked overnight in distilled water. The resin was firm and highly hydrophilic and swelled so little it did not lift of the plate unless peeled off. Its swelling index was 3.1. When glycerol was omitted from the reaction mixture, the cured film dissolved completely, showing no cross-linking.

EXAMPLE 23

Cross-linking of PAMPS with Diols from DMF

To 5% solutions of PAMPS in DMF were added 50 mol % of either 1,3-butanediol or 1,4-butanediol, together with 50 mol % MSA. The solutions were dried at 60° C. in aluminum dishes, and then cured at 140° C. for 3 hours. Water was added and the dishes heated at 60° C. for 4 hours with stirring. In both cases the gels were insoluble, coherent films that appeared as firm as when corresponding amounts of glycerol were used, with swelling indices of 3.0 and 3.1 for the 1,3 and 1,4 diols.

EXAMPLE 24

Cross-linking of P(AMPS-HHAM) from Water

A 200 mg sample of P(AMPS-HHAM) copolymer of 90:10 mol % composition was dissolved in 2 ml distilled water, dried at 60° C. and then heated 1.5 hours at 150° C. After soaking in saturated sodium sulfate and then in water, a cross-linked resin was obtained with a volumetric swelling index in water of 5.0. The same procedure was repeated except that curing for 2 hours at 145° C. was used. The swelling index was then 4.7.

EXAMPLE 25

Cross-linking of P(AMPS-HHAM) blended with PAN from DMAC

A copolymer of 85 mol % AMPS and 15 mol % HHAM was dissolved in DMAC to 10% solids content. To five parts of this solution were added one part of a 10% solution in DMAC of PAN. The final solution was cast at 6 mils onto glass. After drying 30 minutes at 60° C. the film was cured 3 hours at 125° C. After soaking in saturated sodium sulfate, the film was soaked in distilled water. Its lateral swelling was 12.5% and its volumetric swelling index 2.3.

The preceding experiment was performed in the same manner except that a copolymer 20 mol % in HHAM was used. The resulting cross-linked film showed a lateral swelling of 6% and a volumetric swelling index of 2.1.

EXAMPLE 26

Cross-linking of PSPA with Glycerol and MSA and MSA from Water

A 2% solution of PSPA (MW about 1,000,000) was prepared in water. When samples of this solution were dried at 90° C. and cured at 140° C. for 3 hours, the polymer remained fully soluble in water. When 50 mol % MSA was added, the polymer again did not cross-link, but when 50 mol % MSA plus 50 mol % glycerol were added, the cured polymer was a hard coherent solid which softened slightly in hot water but did not well perceptibly.

EXAMPLE 27

Cross-linking of PSEM with Glycerol and MSA from Ethanol

A 10% ethanolic solution of PSEM was prepared containing 50 mol % each of glycerol and MSA. After drying at 60° C. and curing 3 hours at 140° C., a weakly cross-linked gel resulted. If the glycerol was omitted the cured polymer dissolved in ethanol.

EXAMPLE 28

Cross-linking of PTMEAC with Glycerol and MSA from Phenol: TCE; Non-cross-linking of PMAPTAC under Similar Similar Conditions To 10 ml of a 5% solution of PTMEAC in water was added 100 mol % of glycerol and 100 mol % of MSA. Drying and then curing at 140° C. for 3 hrs yielded a resin showing little swelling in water. The positive charge on this acrylate side chain apparently did not inhibit cross-linking.

Two 5% solutions were prepared of PMAPTAC in ethanol at room temperature and in 1:1 phenol:TCE at 75° C. To each was added 50 mol % glycerol and 50 mol % MSA. These solutions were each poured into aluminum dishes, dried at 60° C. and cured at 140° C. for 3 hours. Water, ethanol, and the 1:1 solvent were each added to different samples of the cured resins. In each case the polymer dissolved quickly. It is presumed that the positive charge on the side chains of this N-substituted acrylamide inhibited the cross-linking reaction as discussed above.

EXAMPLE 29

Cross-linking of P(SSA-HEA)

A 1% aqueous solution was prepared of a copolymer with mole ratio 4:1 of SSA:HEA and molecular weight about 1 million. The solution was divided into three parts. To the first part nothing was added. To the second was added 0.5 mole MSA per mole HEA monomer, and to the third was added 0.5 mole MSA and 0.5 mole glycerol per mole HEA. The samples were poured into aluminum dishes, dried, and cured at 140° C. for 3 hours. Water was then added to the dishes and they were heated to 60° C. The untreated copolymer swelled to form a weak gel, but would not dissolve. The copolymer treated with MSA formed a somewhat harder gel. The copolymer treated with MSA and glycerol formed a very hard gel that did not appear to swell significantly.

EXAMPLE 30

Cross-linking of PAM with Diamines from Water

The crosslinking of PAM of MW 5,000,000 was effected as follows. A 2% solution of this polymer in water was made. To it was added a 28 weight % solution of each of three diamines in an amount equal to 25 mole % of the PAM (based upon monomeric units). The three amines were EDA, DAH and DAO. The solutions remained entirely clear after combining the diamines with the polymer. The samples were poured into aluminum dishes to a depth of about 2 mm and dried for 6 hours at 70° C. to remove moisture, then cured for 3 hours at 140° C. The swelling indices were 2.2 with EDA, 4.3 with DAH and 4.8 with DAO. Hydrazine may also be employed for cross-linking and makes extremely short cross-links with advantages where very low swelling is desired.

EXAMPLE 31

Crosslinking of PAM with EDA and MSA from Water 25 mole % each (based on PAM) of EDA and MSA were added as 20 wt % aqueous solutions to a 3% aqueous solution of $5 \times 10^6$ MW PAM. The sample was poured to a depth of about 2 mm in an aluminum dish, dried 6 hours at 70° C. and then cured 3 hours at 140° C. The sample was cooled and water added. The resin swelled to form a coherent film with a swelling index of 5.5. When the experiment was repeated with 50 mole % MSA added rather than 25%, again a coherent film structure was obtained with a swelling index of 4.5.

EXAMPLE 32

Cross-linking of PMAPTAC with Diamines from Water

The crosslinking of PMAPTAC having an approximate molecular weight of $5 \times 10^6$ in a 5% aqueous solution was carried out as follows. A 20% solution of each of three diamines, namely EDA, DAH and DAO were added to the polymer solution in an amount equal to 25 mole % of the PMAPTAC units to form a clear solution. These were poured into aluminum dishes to a depth of about 2 mm, dried for 6 hours at 70° C. and then cured for 3 hours at 140° C. The EDA crosslinked resins were the most hard and firm, with the swelling increasing slightly with increasing methylene chain length of the diamines. Swelling indices were as follows: with EDA, 3.0; with DAH, 3.4; with DAO, 3.5.

EXAMPLE 33

Cross-linking of Polyesters with Diamines from Toluene

Poly(methylacrylate) (PMA) was a 25% solids solution in toluene. Some was poured to a depth of about 3 mm in an aluminum dish.

To another portion of this PMA solution was added 35 mole % of EDA as a 20% solution in DMF, one which was miscible with the PMA solution. This was similarly poured into an aluminum dish. To a third portion of PMA solution was added 35 mole % EDA and 35 mole % MSA, both in DMF and as a 20% solution. An insoluble salt formed immediately, and since one phase was not attainable, the sample was discarded.

The two aluminum dishes containing the polyester samples were dried overnight at 70° C. and then cured at 140° C. for three hours. Toluene was added to the two dishes, they were then heated to 60° C. and magnetically stirred. The PMA sample by itself dissolved completely. The PMA plus EDA sample formed a semi-hard gel with a swelling index in toluene (wet weight of resin divided by its dry weight) of 4.9.

EXAMPLE 34

Cross-linking of P(AN-HPA) with EDA from DMF

Two polymers were compared, P(AN-HPA) of 100,000 MW, 95 mole % AN and 5 mole % HPA, and PAN. Each polymer was dissolved separately to 14% solids in DMF, then poured to a depth of about 3 mm in an aluminum dish. A third solution was made by adding 35 mole % EDA (based on the HPA content) to an appropriate amount of this copolymer solution, and was poured into an aluminum dish. The three dishes were dried at 70° C. for 5 hours and then cured at 140° C. for 3 hours.

Excess DMF was added to each dish, they were heated to 60° C. and magnetically stirred for several hours. The PAN homopolymer dissolved completely. The P(AN-HPA) copolymer alone swelled to form a soft, gelatinous material with a swelling index in DMF of 8.3, and that with added EDA maintained a firm, coherent film structure with a swelling index of 3.0 in DMF. Thus, the use of EDA substantially increased the degree of crosslinking. The P(AN-HPA) copolymer itself was able to crosslink presumably some because of the hydroxyl groups reacted with the oxycarbonyl group of the HPA.

EXAMPLE 35

Attempted Cross-linking of PAMPS with Diamines from Water 25 mole % each of EDA, DAH and DAO were added (as 20 wt % aqueous solution) to three different 5% solutions in water of $3 \times 10^6$ MW PAMPS. The EDA-PAMPS sample precipitated immediately; DAO and DAH-PAMPS became turbid after a minute of stirring, but no precipitate formed. The three samples were each poured to a depth of about 2 mm in aluminum dishes, dried 6 hours at 70° C. and then cured for 3 hours at 140° C. Swelling indices in water were: EDA-PAMPS, fluid gel, 30; DAO-PAMPS, weak gel, 15; DAH-PAMPS, weak gel, 10. The high degree of swelling and poor mechanical properties of these resins was due, in all probability, to ionic precipitation of polymer by protonated amine of opposite charge.

EXAMPLE 36

Attempted Cross-linking of NaPAMPS with EDA with Water

When to 10% aqueous solution of the sodium form of PAMPS was added 25 mole % of EDA as a 20% solution, the solution was clear and was poured to a depth of about 2 mm in an aluminum dish, dried for 6 hours at 70° C. then cured for 3 hours at 140° C. A very soft gel resulted which fragmented and had a swelling index greater than 50.

EXAMPLE 37

Attempted Cross-linking of PMAPTAC with EDA and MSA from Water

Attempts were also made to crosslink PMAPTAC present in a 5% aqueous solution by the addition of 20% aqueous solutions in an amount equal to 25 mole % based on MAPTAC units of EDA and also of MSA, each. Clear solutions were obtained and were poured to a depth of about 2 mm in an aluminum dish and dried for 6 hours at 70° C. and then cured for 3 hours at 140° C. The samples were cooled and water was added. In each case a loose gel formed with a swelling index of 20. When the experiment was repeated with 50 mole % MSA as the only change, the polymer dissolved and it appeared that no crosslinking took place. It was postulated that the excess of acid made the crosslinking reagent positive in charge so it was repelled by the positive polymer and no crosslinking took place.

EXAMPLE 38

PAMPS on PAN Thin-film Composite RO Membrane

A 9% solution of PAN was prepared by heating and stirring the polymer in DMF at 60° C. for several hours. After cooling to room temperature, the clear solution was cast onto Hollytex 3329 using a Gardner knife at 7 mils. The film was immersed in water for 10 minutes to coagulate it, then dried at room temperature. Its initial water flux was 150 µsa at 50 psi.

A 7% solution in methanol of 1.0 parts of 5 million MW PAMPS and 0.13 parts glycerol was cast 7 mils thick onto the PAN support membrane, dried at 60° C. and cured at 140° C. for 3 hours. The membrane gave a flux of 0.22 µsa with 76% salt rejection when subjected to a feed solution of 0.02N KCl at 400 psi.

EXAMPLE 39

PNBAM on PAN Thin-film Composite RO Membrane

A 10% solution of PNBAM in DMF containing 10 mol % each of glycerol and MSA was cast at 8 mils on a PAN support membrane of 1000 µsa pure water flux. The film was air-dried for 10 minutes, oven-dried at 60° C. for 3 hours, then cured at 140° C. for 5 hours. The membrane was soaked in distilled water 24 hours, then mounted in an RO test cell (Gelman) with a 3000 mg/l NaCl feed solution. At 200 psi the initial flux was 0.35 µsa with 87% rejection, at 400 psi it was 0.14 µsa at 92% rejection, and at 500 psi it was 0.1 µsa at 97% rejection.

EXAMPLE 40

Polyacrylamide UF Membrane

A 5% solution of PAM in water was prepared by adding the polymer granules slowly to a blender containing the water and blending at high speed until the solution just began to boil (about 15 min). The blending reduced the inherent viscosity from 3000 ml/g to 2600 ml/g, measured at 25° C. at 0.005% i water. 50 mol % glycerol was added to the blended 5% solution, and it was cast at a thickness of 8 mils on base-treated Hollytex 3396 (soaked 3 days in 3N NaOH). The film was dried at 90° C. and cured 3 hours at 140° C., giving an initial water flux of 340 µsa at 45 psi. When 50 mol % pentaerythritol was substituted for the glycerol, the same flux was observed.

EXAMPLE 41

PAMPS UF Membrane Coagulated in DES

A 3% solution of PAMPS (5 million MW) in 1:1 phenol:TCE was divided into four parts, and 5, 10, 25, and 50 mol % each of glycerol and MSA were added. After casting at 8 mils onto either dense (3396) or medium porosity (3381) Hollytex, coagulating for 2 minutes in room temperature DES, drying and curing for 3 hours at 140° C., followed by soaking in water, the membrane layers adhered strongly to the support and could not easily be rubbed off. All of the membranes were hard, smooth and strongly hydrophilic.

Different mol % cross-linking gave the following pure water fluxes (in µsa): on Hollytex 3381, 5% gave 482, 10% gave 500, 25% gave 580, and 50% gave 675 µsa. On Hollytex 3396, 5% gave 58, 10% gave 58, 25% gave 195, and 50% gave 385 µsa.

EXAMPLE 42

PAMPS/Kynar UF Membrane Coagulated in DES

A solution 10% solids in DMAC was prepared consisting of 5 parts PAMPS (1 million MW), 1 part Kynar and 0.45 part Epon 1031. It was cast at 7 mils onto Hollytex dampened slightly with DES, then immersed in DES at 80° C. for 20 seconds to coagulate the PAMPS, then dried and cured at 140° C. for 3 hours. The membrane had a flux of 1.5 µsa with 93% dye rejection at 100 psi.

EXAMPLE 43

P(AMPS-HHAM)/Kynar UF Membrane Coagulated in DES

The same procedure as Example 42 was followed except that the casting solution was 10% in DMAC and consisted of 5 parts P(AMPS-HHAM) copolymer (9:1 mole ratio, 1 million MW) and 1 part Kynar. DES was used for coagulation and the flux was 2.1 µsa with 90% dye rejection at 100 psi. This membrane showed poor stability in base and disintegrated fairly rapidly in a pH 11 buffer. It is postulated that the hydroxyhexyl groups on the polymer reacted with the diethyl succinate coagulation solvent during curing to yield exposed ester linkages that were easily hydrolyzed.

EXAMPLE 44

P(NBAM-HEA)/PSSA UF Membrane Coagulated in DES

A 6% casting solution in DMF consisting of 3.25 parts PSSA of 1 million MW, 1part P(NBAM-HEA) of 3,000,000 MW and a 9:1 mole ratio, 0.3 parts glycerol and 0.19 part MSA and cast at 7 mils, coagulated for 2 min in DES at 25° C., and then dried and cured at 140° C. for three hours. This membrane had a flux of 30 µsa at 50 psi.

EXAMPLE 45

P(SSA-AMPS)/PNBAM UF Membrane Coagulated in DES

A solution in DMF having a total solute concentration of 4.5% was prepared by combining 0.8 part of P(SSA-AMPS) (MW about 250,000; contained 50 mol % AMPS), 1 part of PNBAM having an intrinsic viscosity of 65 ml/g in DMF at 25° C., 0.36 part glycerol and 0.38 part MSA. This solution was cast at 5 mils onto Hollytex 3396 and then immediately immersed into DES for two minutes. The membrane was then heated in a 140° C. oven containing vapors of DES for 20 minutes, and then cured by heating in a dry oven for three hours at 140° C. After soaking for 10 minutes in brine, the membrane was washed in water and found to have a water flux of 200 μsa.

EXAMPLE 46

Ultrafiltration of Primary Sewage Effluent

A comparison was made of three membranes used for the UF of primary sewage effluent at 50 psi. The first (A) was a commercially available polysulfone UF membrane made by Osmonics, Inc. (SEPA 202 KPS). Membrane B was cast from a solution composed of 2 parts PMAPTAC, 1 part PNBAM, 0.36 parts glycerol and 0.15 parts MSA, all made up to 3.2% solids in 1:1 phenol:TCE, coagulated in DES, and dried and cured 3 hours at 140° C. Membrane C was identical to B except for the use of 1 part glycerol and 0.19 part MSA in the casting solution, the total solids being 3.7%. The membranes were mounted in rectangular cells with an effective area of 12 square inches and a cross-flow of 100 cm/sec across the membrane surface. After more than 100 days of constant ultrafiltration of primary effluent from the Wards Island (New York City) plant, the fluxes of the three membranes at 50 psi were: A, 1.0 μsa, B, 2.8 μsa, C, 3.2 μsa. The chemical oxygen demand (COD) of the primary sewage feed was 1100 mg/l; that of the permeates averaged only 88 mg/l.

EXAMPLE 47

Surface Treatment of Reverse Osmosis (RO) Membranes

RO membranes of those types which will withstand the thermal treatment required for the cross-linking reaction can be rendered hydrophilic. One class of such RO membranes is those prepared from the polymer polybenzimidazole(PBI) (U.S. Pat. No. 3,699,308, Oct. 17, 1972). These membranes have a high thermal stability. Further, often they are annealed by treatment with an organic liquid which can be ethylene glycol and other diols.

A sample of a PBI RO membrane was treated with two solutions by the dip-coating method. The first consisted of a 5,000,000 MW PAM containing 20 mol % EDA (based on PAM units), at a concentration of 0.75% in total solids in ethylene glycol. The second casting solution was a 1% solution of PAMPS of MW 5,000,000 dissolved in the same solvent, with 20 mol % glycerol added as cross-linking agent.

The dry PBI membrane was dip-coated by each of the two casting solutions, with excess solution allowed to run off. The membrane was first dried at 90° C. for 4 hours at which point both membranes appeared quite dry. Following this, the membranes where heat-cured for 3 hours at 140° C. The PBI membrane was kept under tension on a glass plate during the casting, drying and curing processes and it did not become deformed as a result of the treatment. Following the cure, the membranes were each immersed into distilled water and the surface examined. In both cases, a thin but coherent, highly hydrophilic coating was observed on each coated surface, one which did not become discolored by treatment with a test fouling solution, diluted blackstrap molasses.

EXAMPLE 48

Preparation of Electrodialysis (ED) Membranes

ED membranes of low cost suitable for applications which include the use of ED to obtain electrical energy from the mixing of salt solutions of different concentrations, could be prepared by this invention. It is known that the mixing of concentrated and dilute solutions of common salts, such as mixing river water with sea water or mixing concentrated brines with sea water, can be employed in a membrane-type battery to produce electric power. Since the diffusive processes which control the rate of this power generating system are relatively slow, it is critical that thin membranes of low cost be available. A particularly useful embodiment of this concept can be made by the use of a support material of high porosity but calendered on both sides. A porous calendered spun-bonded polyester can serve for this purpose, as well as can other support materials of other compositions. For this ED application, a PAMPS composition identical to that of example 22 is applied to one side of the support sheet and then dried, following which the support side of the support sheet is treated with a PMAPTAC composition with EDA of the kind shown in example 33, and then dried. Following this, both sides can be simultaneously cured to form a porous support matrix with a cation-permeable membrane on one face and an anion-permeable of strong base character on the opposite face.

In the device itself, these membranes are separated by conventional netted plastic spacers of a kind used in conventional ED equipment, with the dilute salt solution of higher ohmic resistance passing through the interior of the support sheet and the concentrated salt solution passing though the netted plastic material which separates one sheet from the next. The sheets are oriented so that the diffusion of ions results in the generation of a potential which gives rise to a current across the stack, from whence electrical energy can be derived from electrodes on opposite ends of the stack. A prime advantage of this system is its low cost and geometry which takes advantage of the different ohmic resistances of the two salt solutions. A low device cost is the principal factor in the commercial utilization of this kind of system for power generation.

EXAMPLE 49

Preparation and Use of Bipolar Ion-exchange Membranes

Bipolar ion-exchange membranes are ones which are cation-permeable on one side and anion-permeable on the other, with the two halves joined together so the resistance of the bipolar membrane is as low as possible and the two halves are chemically cross-linked together. Bipolar membranes have been described, among others, by the patents of Chlanda et al. (U.S. Pat. No. 4,116,889) and Dege et. al (U.S. Pat. No. 4,253,900); these are some of the useful embodiments of this overall concept. Using the teachings of examples 22 and 33 of the instant invention, bipolar membranes were prepared by casting onto a glass plate in PAMPS sulfonic acid membrane of the kind shown in example 22, but cast at a gate opening such its final thickness in the dry state was 20 microns. After this membrane had been cast and dried but not cured, then a quaternary ammonium anion-permeable membrane was cast on top of it, employing the formulation of example 33, and casting to a dry thickness of about 20 microns, also. After it was dried and the bipolar membrane cured at 140° C. for 3 hours, the film was ready for use. Where a stronger mechanical film is desired, each half can be cast by impregnation and the use of a doctor blade onto a fabric of suitable size, strength and non-solvency in the casting solution.

The final bipolar membrane, when mounted in a typical water-splitting cell, between platinum electrodes, could convert a feed of 6% sodium chloride into two product streams of sodium hydroxide and hydrochloric acid at concentrations of approximately 5% at current efficiencies greater than 85%. Because part of the rate-determining step in the operation of bipolar membrane is their hydraulic permeability which allows water from the ambient solutions to replace that pumped out of the center of the membrane by electro-osmosis, it was found that these membranes would withstand currents higher that 100 amperes per square foot without demonstrating losses in current efficiency or increases in ohmic resistance over a period of two months. The low cost of these bipolar membranes make them particularly attractive for certain applications.

EXAMPLE 50

Facilitated transport and solvent-extraction membranes

Membranes suitable for purpose of solvent extraction and facilitated transport can be prepared employing certain of the examples of this invention. For example, when solvent extraction is to be employed using a thin water-insoluble solvent film separating two aqueous solutions, the formulations of examples 20 and 21 can be employed, as examples. A membrane is cast from a PNBAM polymer using the formulation of example 20 onto a Hollytex support at a solids composition and gate opening selected so that its final, dry thickness was estimated to be in the order of 2 microns. In order to obtain a particularly thin film, the membrane could also be cast employing the thin film composite teachings of example 39. Follow casting, drying and curing, the membrane was swollen in a solvent of suitable properties, of which Decalin has been found useful for a number of solvent extraction processes because of its solvent power, its physical and chemical stability, its insolubility in water and its very low vapor pressure. The membrane swelled to approximately three times its original volume so the volume fraction of polymer in the membrane was approximately 25%. This membrane could then be used for solvent extraction processes where the feed was placed on one side of the membrane and the stripping solvent on the opposite side, with both feed and stripping solvents not dissolving the Decalin to an appreciable extent.

In the same manner, an identical membrane was employed for purposes of facilitated transport as described by Kuo and Gregor (*Separation Science Technology*, 18, (5), 421 (1983)). A solution of trioctylphosphineoxide as carrier was used a 25% solution in Decalin sorbed by the membrane to form the facilitated transport system. The membrane was then washed with water and used for the extraction of acetic acid from a feed containing various solutes including acetic acid, circulated on one side of the membrane, with an aqueous, alkaline solution on the other side of the membrane which converted the acetic acid transported across the membrane into sodium acetate, and thus allowed for its extraction as an acid from the feed and its concentration and separation as the salt in the stripping solution.

In a similar manner, other facilitated transport agents can be employed, such as the liquid ion exchangers or LIX reagents which can be employed for the selective extraction of copper from copper leach liquors with the copper extracted and concentrated in a stronger acid solution used as stripping solution.

EXAMPLE 51

Protective Coatings

Protective coatings can advantageously be prepared from a blend of a particularly inert polymer which has a propensity to swell in certain solvents, such as oils, together with one capable of being cross-linked. A useful protective coating can be prepared by dissolving 5 parts of Kynar with 1 part of PNBA (or similar hydrophobic polymer) in a solvent such as DMF, adding a cross-linking agent such as a short-chain diol or a diamine such as hydrazine or EDA. Casting, drying and curing produces a film or coating which swells but slightly in a mineral oil, and serves as an excellent protective coating under such circumstances.

EXAMPLE 52

Pervaporation Membranes Selectively Permeable to Water

Pervaporation (PV) membranes selectively permeable to certain components of a solvent mixture can be prepared by the teachings of this invention by the use of very thin films used in the TFC (thin film composite) configuration cast from polymers which strongly sorb the component whose selective evaporation is desired and thus allow for its selective transport. A high degree of cross-linking is necessary so polymer-permeable component interactions predominate, for swelling opens up pores and allows mixed solvents to permeate.

A PV membrane was prepared by first casting and coagulating a PAN film to form the UF support on Hollytex 3381. Then the PV barrier membrane was prepared by dissolving 5 parts of PAMPS, 1 part of PNBAM and 0.8 parts each of glycerol and MSA to a total solids content of 0.5% in ethanol, dip cast and drained from the support membrane. After drying and curing (3 hours at 140° C.), different mixtures of water and alcohols were circulated at room temperature across the Hollytex side of the membrane, a 1 mm torr vacuum maintained on the other and the vapors trapped, collected and analyzed. The ratio (by weight) of alcohol in the permeate divided by that in the feed was, at 0.5 and 0.9 weight fraction of alcohol in the liquid feed, the following: methanol-water, 1 and 5; ethanol-water, 5 and 20; propanol-water, 12 and 40. A 10% butanol-water in the feed the ratio was 7, while at 95% in the feed the ratio was about 400. With very thin and highly cross-linked PV barrier membranes, these highly selective permeabilities can be maintained along with high fluxes.

EXAMPLE 53

Cross-linked polymer blend membranes

Another of the advantages of the post-cross-linking procedures of this invention is that they allow for a wide combination of homopolymer or copolymer mixtures with other polymers to produce materials designed to fit specific applications.

For example, a useful monomer is polyglycolmethacrylamide (PGMAM), made by combining 163 g polyglycolamine (H-163, Union Carbide) with 101 g triethylamine, 600 ml ethanol and 0.2 g p-methoxyphenol (Fisher), then allowed to react at −50° C. under nitrogen upon the slow addition of 100 g methacryloyl chloride. The product was then filtered at '10° C., and the filtrate passed through a strong base anion exchange region in the hydroxide state, diluted with methanol and passed through a weak base anion exchange resin, finally concentrated and dried.

A casting solution was prepared from DMF and contained 1 part of PAMPS to 5 of P(AN-PGMAM), with 1mol % of glycerol and MSA added (based on PAMPS). The film was cast, then coagulated in water and used as a UF membrane to treat a diluted blackstrap molasses feed. After 23 days of use with this very dark and highly fouling feed, during which time the flux remained constant, the cell was opened and the membrane was found to be still entirely clean, while and free of any evidence of fouling. This formulation employs an insoluble matrix polymer containing polyol side charges which can also cross-link to a strongly hydropholic polymer such as PAMPS.

Where a cation-exchange membrane useful for ED is desired, different ratios of PAMPS to P(AN-PGMAM) can be employed to give different degrees of swelling and porosity, useful for different applications. The same is true for PMAPTAC anion-exchange membranes. The polyelectrolytes can also be selected from a wide range of polymers which do not cross-link themselves. PSSA and a copolymer of P(AN-PNBA) or PNBA form a highly cross-linked cage-type membrane of useful properties, as an example.

EXAMPLE 54

Analytical and Preparative Chromatography Systems

This invention lends itself to the preparation of particularly useful chromatographic systems, both of the analytical and preparative varieties. Since the invention allows one to make very thin films by a casting procedure wherein the pore structure of the film can be controlled by coagulation procedures or by the degree of cross-linking, and where the films can be highly hydrophilic and contained fixed charges of positive, negative or zero charge, chromatography systems of unusual utility can be prepared.

For analytical purposes a high speed for the procedure is most important, and this is achieved by having a very short path for the diffusive processes into and out of a pore or gel-like stationary phase. The use of kinds of thin films of the subject invention is particularly advantageous but the problem of providing for the flow of the mobile phase across the face of the stationary phase so that the "front" of fluid flow is not appreciably distorted must be solved.

Stationary phases having a thickness of 2 or 3 microns are highly desirable because they allow a high speed to the system, but it is desirable to be able to control at will the volume of the mobile to the stationary phase and keep the driving pressure within reasonable bounds. The following formulation was found to be highly useful; it is by no means is the only procedure which can be employed.

First, a very smooth glass plate was coated with a smooth film of paraffin and scribed with a stylus, making parallel lines so as to expose the glass at spacings deemed convenient, ranging from a few mm up to a cm or so. The surface was then treated with hydrofluoric acid or a paste of hydrofluoric acid and a suitable salt so that glass was etched to a thickness of from 1 micron up to several microns. The etched grid was usually rectangular or a parallelogram in nature so that both the vertical and lateral flow of the mobile phase could take place uniformly. At that point the paraffin layer was dissolved, the plate cleaned and a uniform layer of one of the several formulations of the subject invention was cast upon it. The formulations of Examples 19, 22, 23, 26, 228, 30, 31, 32, and the like could be employed. By varying the conditions of casting and the percent solids of the casting solution, films of different thickness are prepared. Coagulation produces different degrees of porosity, again controllable within certain ranges. At this point the film is dried, cured, wetted with water and the film containing a grid of corrugations on one surface, entirely composed of the same material, is the result.

To make a chromatographic device, it is sufficed to carefully wind the partially dried film onto a cylinder and place this onto another cylinder slightly larger in size. With the membrane now mounted in a device having suitable entrance and exit ports for distribution of the solvent, and then wetted it swelled appropriately and may serve as an admirable analytical chromatography system, Its high speed results from the extremely short diffusion paths; its configuration with channels running down through and across the column makes for a system which does not require a high pressure in contrast to the usual HPLC devices which employs very fine beads of uniform diameter, one difficult to prepare, and also giving rise to a high pressure.

The advantage of the corrugated stationary phase makes it possible to have very fine spacings which are highly hydrophilic without the necessity for employing very fine fabrics or the like, which usually have a minimal thickness of at least 5 microns and are usually several times that thickness.

The same general procedures apply to the making of preparative chromatography columns but her since larger dimensions are allowed, one can wind either coagulated or non-coagulated membranes about a cylinder, with the latter employing very fine cloth as the spacer material. However, since the denaturation of proteins onto almost all surfaces constitutes such a major problem in biochemistry and molecular biology, it is advantageous to employ fine fabrics which are coated to make them strongly hydrophilic. Or, fibers can be spun from the polymeric formulations of the various examples an woven into fabrics. Or, the stationary phase can be a fabric which can be quite uniform and which can serve for both a stationary phase and a spacer.

Since the casting of membrane films is a highly developed technology which can be carried out on a large scale with good control over the various physical properties of the film, it is obvious that large scale preparative chromatography systems are readily prepared by the teachings of this invention.

Of particular interest are chromatographic systems which separate low molecular weight materials of highly similar nature, such as polypeptides and oligomers of low molecular weight carbohydrates, as an example. These are important materials in molecular biology. Also, the analysis of ions by ion-exchange HPLC systems has many uses, and the materials described heretofore will find a application here, also.

EXAMPLE 55

Polymer Sheets of Specific Affinity

The techniques of modern molecular biology frequently make use of sheets of nitrocellulose, as an example, because this material has a high affinity for small fragments of RNA or DNA, as for nucleic acids of molecular weight of the order of about 12,000. Nitrocellulose is commonly used to hold the polymer on the surface while reactions are carried out with it. More recently, some synthetic treated nylons and other materials have been employed for this purpose, as has been DEAE cellulose paper, polylysine bound paper and the like.

The teachings of this invention lend themselves particularly well to the making of surfaces having groups on them with specific affinity, but holding the material such that denaturation is absent. With only certain groups of the nucleic acid held to the surface in a selective manner, reactions can be performed to advantage.

The teachings of this invention also allow for the cross-linking of nucleic acids to the paper, employing the typical post-cross-liking or binding reactions employed for the immobilization of enzymes and proteins. These reactions, when combined with the highly hydrophilic and non-denaturing action of the surface give to the investigator a powerful tool for the modification of the nucleic acids. The absence of non-specific binding of proteins and similar molecules constitutes a major advantage.

EXAMPLE 56

Sheets for PAGE

Polyacrylamide gel electrophoresis (PAGE) is a commonly employed technique to identify small amounts of protein in a complex mixture, usually employed a detergent such as SDS to form rod-like molecules so the protein migrates at a speed characteristic of its molecular weight. PAGE plates are usually highly fragile and sometimes difficult to prepare. When a further identification of a particular species is desired, the removal of a specific slice of the plate is a tedious and somewhat difficult procedure.

Very thin and highly stable PAGE plates can be prepared from sheets of thin and strong plastics (such as elongated polyesters or Mylar (DuPont). These can be coated directly by a polymer dissolved in an organic solvent which wets the plastic and forms a bond between the active material of the PAGE film and the base plastic. Or, as an example, Mylar sheets can be treated on one side by a strongly alkaline solution for a short period of time to hydrolyze some of the ester bonds and render the material readily wetted by water and susceptible to chemical bonding by the casting formulations of the subject invention.

These PAGE sheets may be made by casting or dip-coating onto them one of the polymers suitable for the separation desired, to produce a thin gel film either or zero charge, negative or positive charge and of a porosity that can be set by coagulation. Then the film is dried and cured in the standard manner. PAGE films having a thickness of 1-2 microns and upwards to several microns are readily prepared by this procedure. The dried and cured films can be stored dry and made ready for the PAGE procedure by immersion in buffer, placing the base film on a glass plate with another glass plate on top to eliminate dead spaces and provide uniformity of thickness and rigidity. Then the sample of unknown is applied, the current passed and the separation takes place. At that point the system is simply disassembled and stained. These PAGE gels are firm and can have wide pores and still have a reasonable mechanical strength due to their mode of fabrication. After the staining procedure has been applied, sections of the sheet are cut out for subsequent purposes. The small thickness and nature of this PAGE system lends itself to the isolation and identification with extremely small samples of materials of similar nature, such that often other limitations such as the sensitivity of the analyical procedures which are available become limiting factors.

EXAMPLE 57

Desalting and Concentration of Protein Solutions

Proteins are readily desalted and/or concentrated by the use of a hydrophilic UF membrane either having a fixed charges of the same sign as that of the protein, or preferably the material of choice is an uncharged membrane made from PAM, PNMAM or PDMAM. Ultrafiltration is a preferred method of desalting/concentration because it is rapid. Ordinary dialysis can be employed, but it is slow by comparison.

The sizing of the membrane pores can be done in a reliable manner only by empirical means, namely by making membranes of differing porosity and testing these for the non-passage of the desired protein. Since proteins are usually highly deformable, gel-like molecules the techniques employed are important. A low pressure is usually used so as not to deform the protein and force it through the pores. The use of a high rate of cross-flow or other means to minimize concentration polarization are employed to keep the flux high and minimize the formation of a gel layer on the membrane. Where the loss of protein by surface denaturation is required, the walls of the UF cell can be coated with a strongly hydrophilic material of the kind described in other examples. The inner lumen of connecting tubing can be similarly treated.

The simplicity of this procedure and its speed makes it particularly useful when valuable materials which are labile and easily denatured or which deteriorate rapidly are involved.

EXAMPLE 58

Hydrophilic Microfiltration Screens

Microfiltration screens of high mechanical strength and highly precise openings can be prepared by the present invention by coating the screen itself with several of the formula given as examples in this invention. Common articles of commerce are fine screens fabricated from metal wire and a number of polymers including polyolefins, polyesters and nylons, usually made for purposes of silk screening or ultrafine filtration. However, all of these suffer from the disadvantage in that hydrophobic and gelatinous materials adhere to the openings of these screens, clog them and are difficult to dislodge by backwashing. The same applies to wider screens employed for the dewatering of cakes or other semisolid materials, usually containing water as the liquid.

It has been found that particularly useful microfilters can be formed by coating these fine screens with hydrophilic polymers. With monofilament screens of polyester and nylons, the procedure is particularly simple and a wide variety of casting formulations are available.

Care must be employed not to use solvents which attack the monofilament screens rapidly. In the case of polyolefinic screens, a prior treatment with one of the conventional procedures which includes the use of chromic acid dip or a corona discharge serves to make the surface receptive to wetting and subsequent adhesion of the coating. Wire screens usually require a precoat which can be one of the commercially available epoxide formulations used as primer coats. These can be extremely thin and adhesion to these by the formulations of this invention are excellent.

A typical application is a polyester screen obtained from Tetko (Ardsley, N.Y.), first dipped into the casting solutions and then passed through a casting device to remove excess solution. Sometimes it is necessary to apply a gentle vacuum to the film to remove excess droplets of casting solution. Following this, the film is dried for 2 hours at 60° C. and then cured for 3 hours at 140° C. Microscopic examination of the screen showed that when the coating was properly applied, the screen was entirely coated with the hydrophilic polymer, as-certained by employing a dye which strongly dyes the screen material itself but not the polymer coating. The coating process is usually carried out with the screen being passed over a roller under appropriate tension with the doctor blade passing over the top of the screen; and in this way the loops between adjacent fibers are drawn tight and the casting solution not only coats the screen but acts as an adhesive to close off loops and seal them.

Following the usual drying and curing procedure, it is found that these screens are highly effective for the microfiltration of such materials such as cell suspensions resulting from the fermentation of beverage alcohols, primary and secondary sewage sludge as well as raw water from which removal of cells and other suspended solids is to be desired.

One of the particularly useful manifestations of this invention is the use of such screens mounted on the outside of a rotating, porous cylinder which spins in an annular space through which the feed suspension is pumped under pressure. A double effect can be achieved by coating both the rotating surface and the stationary porous surface with the same screen. This mechanical arrangement gives rise to a highly effective stirring at the surface of the screen, a phenomenon well known as Taylor's Vortices. Under the influence of such vortices, the suspended solids are collected in bands which, under the influence of an upward or downward flow of the feed through the annulus, produce a "rope" of concentrated, suspended solids which exits from the port and a substantial concentration of material is achieved thereby. The pressures employed can be low. By the use of the hydrophilic surfaces of the subject invention where adhesion of suspended solids is not a problem, spinning rates of only 300-600 RPM have been found to be effective. An excellent concentration of the suspended solids in a stillage gained from the manufacture of beverage alcohol was achieved, from 5 to 18% solids.

When the same, hydrophilic material is employed as a coating on a cylinder or flat plate device under ordinary conditions of cross-flow, the rate of cross-flow must be high because the flow of permeate forces the suspended solids against the surface of the microfilter, and leads to a slow rate of filtration through the surface layer.

When a wire or polymeric screen not of strongly hydrophilic nature is used in the spinning device, speeds of rotation upwards of 2000-3000 RPM are required to produce enough shear to allow the filtration process to take place at an acceptable rate. Thus, it is only by a combination of configurations such as lead to vortices such as those of Taylor's and the hydrophilic materials, the making of which are taught by this invention, is a major advantage for the removal of suspended solids achieved.

The same considerations apply to ultrafiltration processes such as those which involve the removal of low molecular weight solids from solutions of proteins or, in the case of more porous membranes, for the separation of proteins from one another. In many of these separations the extent of convection at the membrane or microfilter-solution or suspension interface is critical, and it is by a combination of a hydrophilic surface and a moving surface that high flux rates results can be obtained.

EXAMPLE 59

Surfaces, Ultrafilters and Microfilters to which Proteins, Enzymes, Antibodies and other Biopolymers are bound and their use in affinity sorption and enzymatic conversion processes The use of an insolubilized polymer or copolymer containing substituents to which biomaterials such as enzymes, proteins, antibodies and the like can be bound and used for a variety of purposes ranging from the making of assays for specific materials to their use as bioreactors is well known. Reference can be made to the several patents of Gregor and more recently to a pending application (U.S. Ser. No. 618,652) of Gregor et al. All of these systems, based as they are upon polymers which are either hydrophobic or not strongly hydrophilic, suffer from the disadvantage of non-specific adsorption. The co-pending application (U.S. Ser. No. 618,652) makes reference to a number of known coupling chemistries such as those which employ an aryl amine, a pyridine, a hydroxyl-containing olefin such as N-hydroxy substituted acrylamide and the like. These systems are similar to some of the chemical binding reactions of Inman and Dintizis, already cited. The co-pending application refers to the use of a functional co-monomer containing an arylamine, a pyridine or a substituent containing a hydroxyl group which may be part of the co-monomers N-(5-hydroxy-3-oxa-pentyl) acrylamide and N-(9-hydroxy-4-7-dioxa-nonyl) methacrylamide. Thus, either by a substitution reaction on a linear or cross-linked polymer containing a pendant amidocarbonyl or oxycarbonyl group suitable for cross-linking under the teachings of this invention, strongly hydrophilic polymers which can be insolubilized by the teachings of this invention can be made into useful surfaces, microfilters, membranes and the like.

These surfaces, membranes and microfilters can be activated by those skilled in the art, as by trichlorol-s-triazone, by diazotization, by cyanogen bromide activation of a pyridyl-containing polymer or by other known coupling reactions.

A very wide range of biopolymers including chymotrypsin, glucose isomerase, protein A, bovine serum albumin and the like maybe coupled.

These biopolymer-coupled systems may be applied to the separation and isolation of soybean trypsin inhibitor by coupled chymotrypsin, in a manner such that non-specific adsorption does not interfere and all of the soybean trypsin inhibitor sorbed by the membrane can be desorbed by conventional techniques which include changes in pH as well as the use of decoupling agents such as urea.

Similarly, protein A can be immobilized to a hydrophilic support material, then an antibody such as IgG bound to it and if needed, coupled by techniques known to those skilled in the art. Such immobilized antibodies may be employed for purposes of analysis, separation and purification.

The process of affinity adsorption similarly maybe applied to the removal of fibronectin by a hydrophilic polymer to which the protein gelatin has been coupled.

As another example, protein A may be immobilized, then allowed to bind to anti-human serum albumin IgG. Then the antigen HSA in IgG binding buffer is applied to the carrier system, washed free of undesired materials and eluted in a pure and concentrated form. sorption.

It is well recognized that the micro-environment of an enzyme, as an example, can influence its catalytic activity. The teachings of the subject invention not only provide for a highly hydrophilic environment but also one where a net charge which is either positive or negative can be placed in the vicinity of the coupling group, thus making for a optimal micro-environment for the process.

EXAMPLE 60

Surface Treatment of Fabrics and Papers

The teachings of the subject invention may be applied to the surface treatment of fabrics and papers of cellulosic and non-cellulosic origin, for several purposes. These include the imparting a variable degree of hydrophilicity and/or resistance to the accumulation of static charges by virtue of the electrical conductivity give to the material resistance to creasing and receptivity to fillers. Other desirable properties such as receptivity to dyes and inks can similarly be obtained by a surface modification using the teachings of the subject invention. Since by a subsequent thermal treatment it is possible to produce chemical bonds between the polymers and the substrate paper or fabric, these surface treatments are relatively permanent and will not be removed by washing or similar cleansing procedures. The fact that some of the materials of the subject invention consist of a single polymer dissolved in a common solvent makes the application particularly convenient and the release of soluble products which usually cause stream pollution is minimized.

Two washed fabrics, one of a polyester (Dupont Dacron) and another of a polyamide (Dupont Zytel) were dipped into a 0.5% solution in water of P(AMPS-HHAM) (example 15), the excess solution shaken off and the fabric was dried to 60° C. and then cured for 3 hours at 140° C. They were then rinsed briefly with a dilute sodium bicarbonate solution, then with water and dried. The finished fabrics were found to have acquired a different "hard" in that they did not cling, felt more like cotton than a synthetic material, and absorbed water more like a cellulosic material than a synthetic one.

EXAMPLE 61

Determining Extent of Cross-linking

The extent of cross-linking of a polymer can be estimated in several different ways. A practical test is to determine the swelling index of the resin in a solvent in which the polymer is highly soluble. Quantitative experiments were performed where the amount of the group displaced from the polymer by the cross-linking reaction was determined. In one series, PAM of $3 \times 10^6$ MW was dissolved in water in a closed flask along with varying amounts of several polyol cross-linking agents, including glycerol, TMP and pentaerythritol, the solution dried at 60° C., followed by curing at 140° C. for 3 hours. Then the flask was cooled and the ammonia released by the cross-linking reaction was neutralized with an excess of standard hydrochloric acid, and an aliquot of this solution (plus that used to rinse the insoluble resin) was back-titrated with standard base to measure released ammonia. The mole ratio of released ammonia to polyol or to PAM units was calculated as a function of mole ratio of polyol to PAM and from these data it was concluded that the degree of cross-linking varied from about 4 to 11%. This procedure does not show cross-linking between different PAM chains as contrasted with cross-links formed between two groups on the same chain. However, since a solvent in which PAM is highly soluble (and elongated) was used and steric effects with certain polyols favor inter-chain cross-linking, it was concluded that inter-polymer crosslinks predominated.

Similar experiments were performed with PAMPS and a fully-substituted $C^{14}$ glycerol (along with ordinary glycerol) in water with MSA catalyst. After drying and cure the radioactive incorporation in the washed resins was measured. A high level of cross-linking was present, estimated from 8% to 15% as inferred from the data.

A number of experiments were also performed wherein to PAMPS in DMF and to PAM in ethylene glycol were added varying amounts of glycerol and MSA. After drying at 80° C. for 5 days and curing at 140° C. for 3 hours, the swelling index in water was measured. Under favorable conditions, swelling indices of 2.4 to 3.0 were found for PAMPS, and 2.1 to 3.0 for PAM, indicative of the very high degrees of cross-linking attainable by employing the teachings of this invention.

The choice of solvent influences, to some extent, the swelling index. PAMPS appears to be more highly cross-linked from water than from DMF, probably because it is more elongated in water.

It will be appreciated that the instant specification and examples are set forth by way of illustration and not limitation, and that various modifications and changes may be made without departing from the spirit and scope of the present invention.

What is claimed is:

1. A post-cross linked polymer composition, which is identical to that produced by solid-state cross-linking at a suitable temperature of a composition formed from a solution comprising the following ingredients:
   (a) at least one polymer consisting of monomer units of acrylamide, N-substituted acrylamide, or N-substituted methacrylamide, the N-substituted acrylamide and N-substituted methacrylamide being substituted on N by one or two substituents each independently selected from the group consisting of $C_{1-10}$-alkyl and $C_{1-10}$-alkyl substituted by —$SO_3H$, and wherein 80–100% of said monomer units in the polymer are the same; and (b) a low molecular weight polyol or polyamine selected from the group consisting of (i) alkane polyols having 1 to 6 carbon atoms and 1 to 4 hydroxyl groups, (ii) hydrazine and (iii) alkane diamines having 1 to 6 carbon atoms; and wherein the polymer composition obtained is characterized by the following properties:

(c) a tight concatenated structural network;
(d) a high degree of cross-linking;
(e) a swelling index of less than 5 in water;
(f) a high degree of surface hydrophilicity; and
(g) water insolubility.

2. The polymer composition according to claim 1, wherein ingredient (a) is a homopolymer.

3. The polymer composition according to claim 1, wherein 80–100% of the monomer chain units are units of 2-acrylamido-2-methylpropanesulfonic acid or acrylamide.

4. The polymer composition according to claim 1, wherein the low molecular weight polyol is glycerol or pentaerythritol.

5. The polymer composition according to claim 1, wherein the low molecular weight polyamine is ethylene diamine.

6. The polymer composition according to claim 1, which is produced by coagulation of the solution, then drying and then solid-state cross-linking.

* * * * *

UNITED STATES PATENT AND TRADEMARK OFFICE
CERTIFICATE OF CORRECTION

PATENT NO. : 5,280,078
DATED : January 18, 1994
INVENTOR(S) : Gregor, et al.

It is certified that error appears in the above-indentified patent and that said Letters Patent is hereby corrected as shown below:

Title Page    [76]   Inventors:   Second Inventor delete
" Samuelson " and substitute -- Samuelsen  -

Signed and Sealed this

Twelfth Day of March, 1996

Attest:

BRUCE LEHMAN

Attesting Officer    Commissioner of Patents and Trademarks